(12) United States Patent
Sergyeyenko et al.

(10) Patent No.: US 6,926,090 B2
(45) Date of Patent: Aug. 9, 2005

(54) HINGED EDGER HOUSING HAVING IMPROVED INTERNAL DEBRIS GUARD AND LABYRINTH PERIMETER SEAL

(75) Inventors: Oleksiy P. Sergyeyenko, Brockville (CA); Jacob R. Prosper, Brockville (CA); David M. Shaver, Brockville (CA)

(73) Assignee: Black & Decker Inc., Newark, DE (US)

( * ) Notice: Subject to any disclaimer, the term of this patent is extended or adjusted under 35 U.S.C. 154(b) by 33 days.

(21) Appl. No.: 10/428,514

(22) Filed: May 2, 2003

(65) Prior Publication Data

US 2003/0192710 A1 Oct. 16, 2003

Related U.S. Application Data

(62) Division of application No. 09/981,053, filed on Oct. 16, 2001, now Pat. No. 6,612,376.

(51) Int. Cl.$^7$ .............................................. A01D 15/00
(52) U.S. Cl. ............................ 172/15; 56/17.4; 56/17.5; 172/17
(58) Field of Search ................................ 56/17.4, 17.5; 30/292, 306, 319; 172/13, 14, 15, 16, 17, 18, 19, 41, 42

(56) References Cited

U.S. PATENT DOCUMENTS

| | | | | |
|---|---|---|---|---|
| 3,627,054 A | * | 12/1971 | Lay ............................... | 172/14 |
| 3,788,049 A | | 1/1974 | Ehrlich | |
| 3,807,151 A | | 4/1974 | Rosenthal et al. | |
| 3,872,930 A | | 3/1975 | Campbell | |
| 3,969,877 A | * | 7/1976 | Moss et al. ................... | 56/256 |
| 4,275,623 A | * | 6/1981 | Walter .......................... | 81/126 |
| 4,277,935 A | | 7/1981 | Degen | |
| 4,463,544 A | | 8/1984 | Carsello et al. | |
| 4,478,028 A | | 10/1984 | Dawson, Jr. | |
| 4,756,148 A | | 7/1988 | Gander et al. | |
| 4,803,831 A | | 2/1989 | Carmine | |
| 4,979,573 A | * | 12/1990 | Williamson ................... | 172/15 |
| 4,984,417 A | | 1/1991 | Braun et al. | |
| 5,065,567 A | | 11/1991 | Wessel et al. | |
| 5,301,757 A | | 4/1994 | Kelley, Jr. | |
| D347,011 S | | 5/1994 | Baxter | |
| 5,325,928 A | * | 7/1994 | Wagster et al. ............... | 172/15 |
| 5,490,371 A | | 2/1996 | Potucek, III | |
| 5,669,212 A | * | 9/1997 | Bening et al. ............... | 56/13.3 |
| 6,003,611 A | | 12/1999 | Martinez | |
| D427,861 S | | 7/2000 | Cooper et al. | |
| 6,116,350 A | | 9/2000 | Notaras et al. | |
| 6,125,943 A | | 10/2000 | Valois | |
| 6,263,975 B1 | | 7/2001 | Rosa et al. | |
| 6,289,660 B1 | | 9/2001 | Martinez | |
| 6,612,376 B2 | * | 9/2003 | Sergyeyenko et al. ........ | 172/15 |

* cited by examiner

*Primary Examiner*—Victor Batson
(74) *Attorney, Agent, or Firm*—Harness, Dickey & Pierce, P.L.C.

(57) ABSTRACT

A housing assembly for a power edger that includes a housing, a door and a latching system. The door is coupled to the housing and movable between an open position and a closed position. The latching system includes a latch member that is coupled to one of the housing and the door and a ramp that is coupled to the other one of the housing and the door. Contact between the ramp and the latch member when the door is being closed against the housing causes the latch member to move to an unlatched condition so as to automatically align the latch member to a latch aperture. This permits the door to be fully closed without the need to manually operate the latch member.

21 Claims, 5 Drawing Sheets

HINGED EDGER HOUSING HAVING IMPROVED INTERNAL DEBRIS GUARD AND LABYRINTH PERIMETER SEAL

CROSS-REFERENCE TO RELATED APPLICATIONS

This application is a divisional application of U.S. Ser. No. 09/981,053, filed on Oct. 16, 2001 now U.S. Pat. No. 6,612,376.

FIELD OF THE INVENTION

The present invention generally relates to power edgers and more particularly to a housing assembly for housing the blade member of a power edger.

BACKGROUND OF THE INVENTION

Powered edgers having a rotary blade for performing an edging operation require routine maintenance in that the rotating blade is subject to wear and must be periodically sharpened or replaced. Furthermore, debris, such as grass and dirt, tend to accumulate on the guard around the blade and must be removed in order to maintain the efficiency and effectiveness of the edger device.

Typical housing assemblies for rotary edgers include a screw-attached guard plate that must be removed from a housing in order to gain access to the blade or to remove accumulated debris. In addition to being inconvenient, these conventional housing assemblies frequently do not thoroughly seal against the housing such that dirt and debris have been known to infiltrate in an undesired manner around the guard plate.

Accordingly, there remains a need in the art for an improved housing assembly for a power edger. The improved housing assembly is preferably highly resistant to the infiltration of debris around an access door and includes a guard that is more resistant to the accumulation of debris.

SUMMARY OF THE INVENTION

In one preferred form, the present invention provides a housing assembly for an edger. The housing assembly includes a housing, a door that is pivotably coupled to the housing, a latch mechanism and a latch receiving structure. The latch mechanism is coupled to one of the housing and the door and includes a latch member and a biasing device. The biasing device is coupled to the latch member and is operable for biasing the latch member in a predetermined biasing direction toward a predetermined neutral position. The latch receiving structure is coupled to the other one of the housing and the door and includes a ramp portion and a latch aperture. The ramp portion tapers downwardly toward the latch aperture and is configured to contact the latch member when the door is rotated toward the housing and cause the latch member tp rotate in a direction opposite the biasing direction so that the latch member is positioned into alignment with the latch aperture.

In another preferred form, the present invention provides an edger including a blade, a power source that is configured to selectively provide rotary power to the blade, and a housing assembly that is associated with the power source. The housing assembly associated defines a blade cavity in which the blade is mounted and includes a housing, a cover, a latch mechanism and a latch receiving structure. The cover is pivotably mounted to the housing and movable between a closed condition and an open condition. The latch mechanism is coupled to the cover and includes a latch member, which is movable between a latched position and an unlatched position, and a spring, which biases the latch member into the latched position. The latch receiving structure is coupled to the housing and includes a latch aperture, which is configured to receive the latch member therethrough only when the latch member is positioned in the unlatched position, and a ramp. The ramp is tapered so that when the cover is rotated toward the housing, contact between the ramp and the latch member moves the latch member into the unlatched position and into alignment with the latch aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
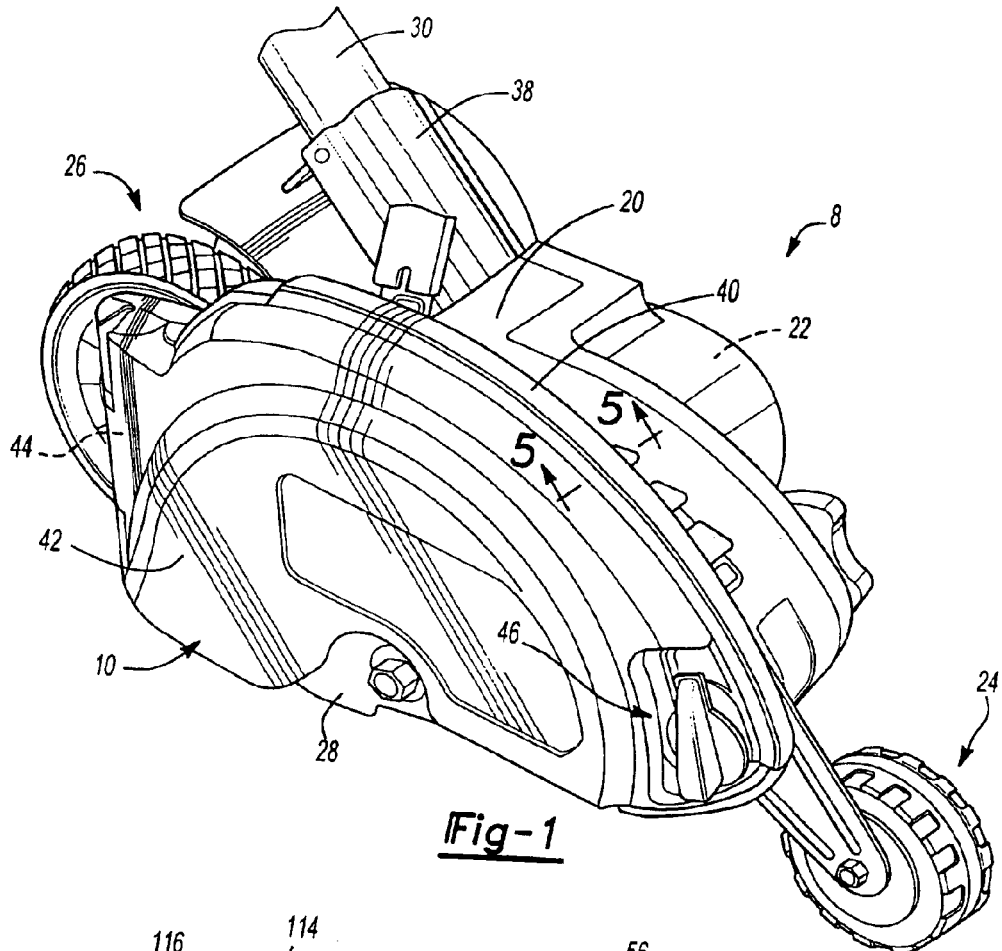
FIG. 1 is a perspective view of a power edger having a housing assembly that is constructed in accordance with the teachings of the present invention.
Figure 2:
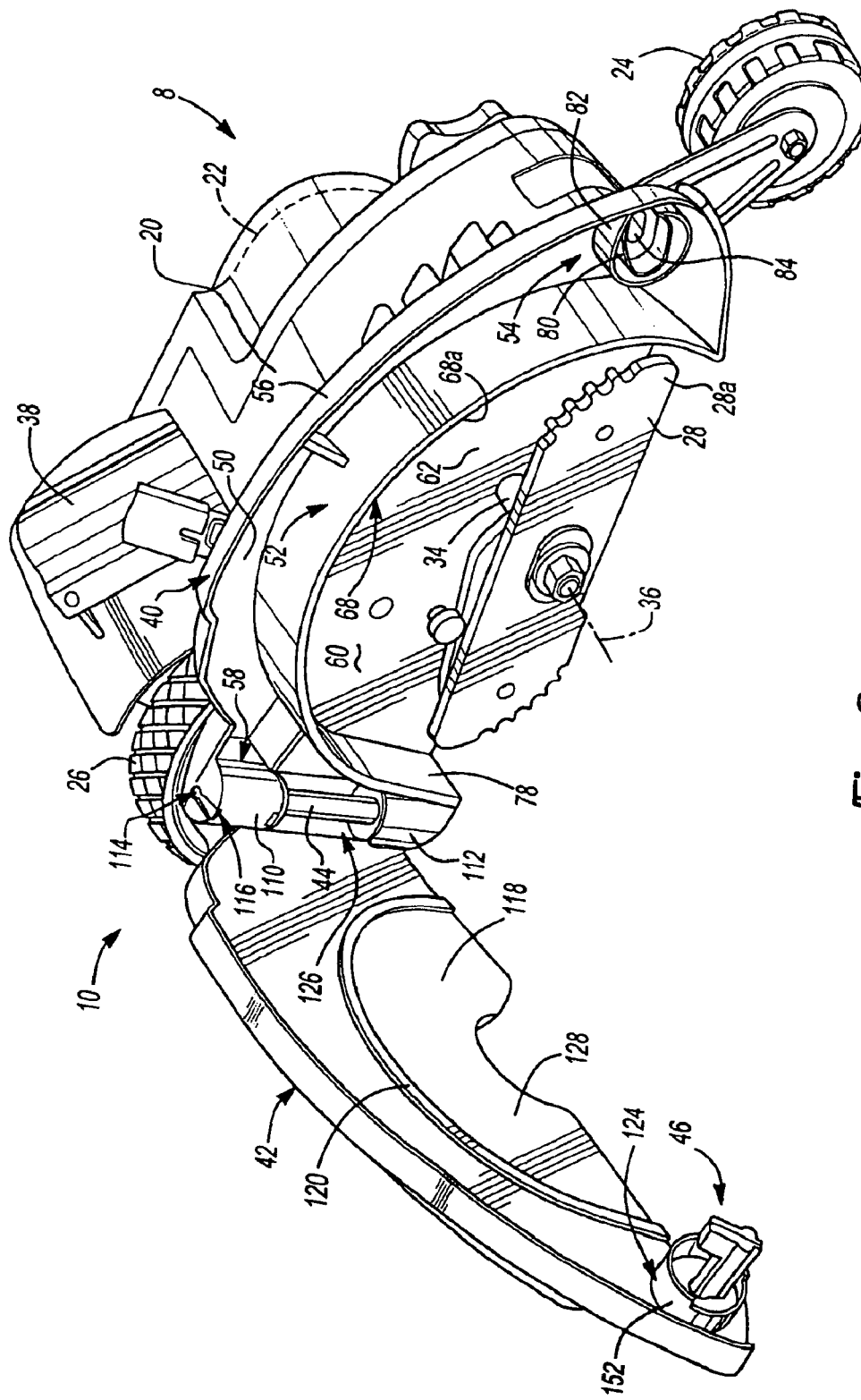
FIG. 2 is a perspective view of the power edger of FIG. 1 illustrating the door in an open condition.

With reference to FIGS. 1 and 2 of the drawings, an edger 8 is illustrated to include a housing assembly 10, which has been constructed in accordance with the teachings of the present invention. The edger 8 is also shown to include a shroud 20, a rotary power source 22, front and rear wheels 24 and 26, respectively, a blade 28 and a handle 30. The shroud 20 conventionally houses the rotary power source 22 and serves as the means by which the front and rear wheels 24 and 26 and the handle 30 are coupled to the rotary power source 22. In the particular embodiment illustrated, the shroud 20 is an integrally formed portion of the housing assembly 10, but those skilled in the art will understand that the housing assembly 10 may be discrete and separate from other portions of the edger 8, including those that house a rotary power source. The rotary power source 22 is illustrated to be an electric motor in the example provided and includes an output shaft 34 that is rotatable about a rotary axis 36. The blade 28 is fixedly but removably coupled to the output shaft 34 such that it is rotatable about the rotary axis 36. At least one of the front and rear wheels 24 and 26 is preferably movably coupled to the shroud 20 of the housing assembly 10 to permit the height of the blade 28 to be adjusted relative to the ground. The handle 30 is coupled to the shroud 20 via an attachment socket 38 that is integrally formed into the shroud 20.

Figure 3:
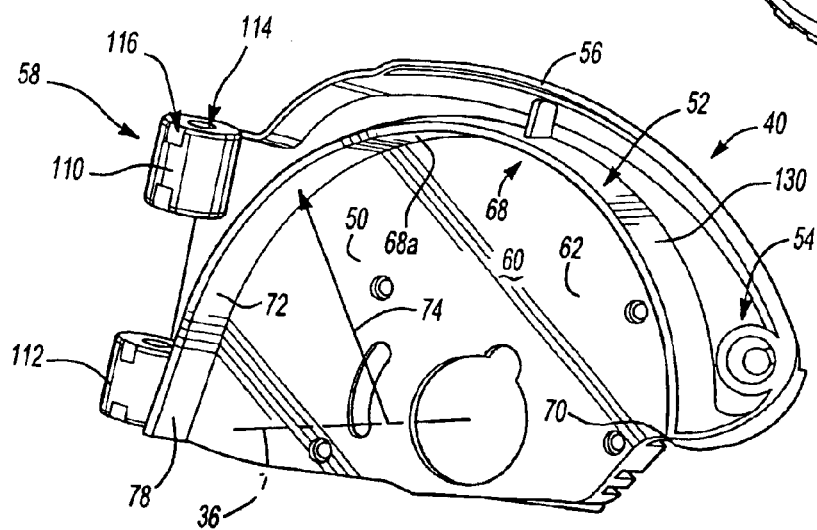
FIG. 3 is a perspective view of a portion of the power edger of FIG. 1 illustrating the housing in greater detail.

The housing assembly 10 is also illustrated to include a housing 40, a door 42, a hinge pin 44 and a latch mechanism 46. With reference to FIGS. 2 and 3, the housing 40 includes a first wall member 50, a guard 52, a latch securing structure 54, a first labyrinth member 56 and a first hinge structure 58. The housing 40 defines a blade cavity 60 in which the blade 28 is rotatably disposed and a generally vertical portion 62 that is oriented generally perpendicular the rotary axis 36 of the output shaft 34.

The guard 52 extends generally perpendicularly from the first wall member 50 in a direction that is generally parallel the rotary axis 36 such that the guard 52 bounds the outer perimeter of the blade cavity 60. The guard 52 is illustrated to include a confronting portion 68 having a leading end 70 at the forward end of the housing 40 and a trailing end 72 that is located rearwardly of the leading end 70. The confronting portion 68 is defined by an angle of at least 90° and preferably by an angle of at least 120°. The confronting portion 68 is also characterized by a radius 74 that is centered at a point along the rotary axis 36. The radius 74 is not constant, but rather increases in a smooth manner in the direction in which the blade 28 rotates between a leading end 70 and a trailing end 72. The increasing sweep of the radius 74 therefore provides an increasing amount of clearance between the tip 28a of the blade 28 and the inner surface 68a of the guard 52 between the leading end 70 of the confronting portion 68 and the trailing end 72 of the confronting portion 68. Preferably, the amount of clearance between the leading end 70 and the trailing end 72 increases by a factor of between about 2 to about 10. Those skilled in the art will understand that while the rate by which the radius 74 increases may correspond to any mathematical model, the rate by which the radius 74 increases is dependent upon numerous considerations, including the maximum overall size of the housing assembly 10 and the capability of the blade 28 to circumferentially shed the dirt and debris encountered by the blade 28 during the operation of the edger 8.

In the particular embodiment illustrated, the guard 52 is shown to include a trailing portion 78 that is coupled to the trailing end 72 of the confronting portion 68, extending therefrom in a direction that is generally tangent the radius 74 at the trailing end 72. The trailing portion 78 is configured to maintain an increasing amount of clearance between the guard 52 and the tip 28a of the blade 28 while permitting the overall size of the housing assembly 10 to be maintained within a predetermined size envelope. In this regard, the trailing portion 78 extends rearwardly by an amount that is relatively smaller than the amount the confronting portion 68 otherwise would have extended had the radius 74 been extended downwardly to the bottom edge of the housing 40.

The extremely smooth configuration of the inner surface 68a of the guard 52 generally, and of the confronting portion 68 in particular, tends to resist the build-up of dirt and debris that is centrifugally directed at the housing assembly 10 by the rotation of the blade 28. As such, the frequency and/or duration of routine cleaning events are reduced as compared with other known edger housing assemblies.

The latch securing structure 54 is illustrated to be integrally formed with a forward portion of the housing 40. The latch securing structure 54 includes a ramp portion 80, a first debris collar 82 and a latch aperture 84. In the example provided, the ramp portion 80 is formed on a helix having an axis that is generally parallel the axis 36. The helix has an inner most point 88 that is positioned on a side of the latch aperture 84 and an outer most point 90 that is rotated in a counterclockwise direction relative to the inner most point 88. The first debris collar 82 surrounds both the ramp portion 80 and the latch aperture 84, extending generally perpendicularly from the forward portion of the first wall member 50. In the particular example provided, the latch aperture 84 is illustrated to have a key-hole shape that includes a cylindrical portion 92 and a slotted portion 94.

Figure 5:
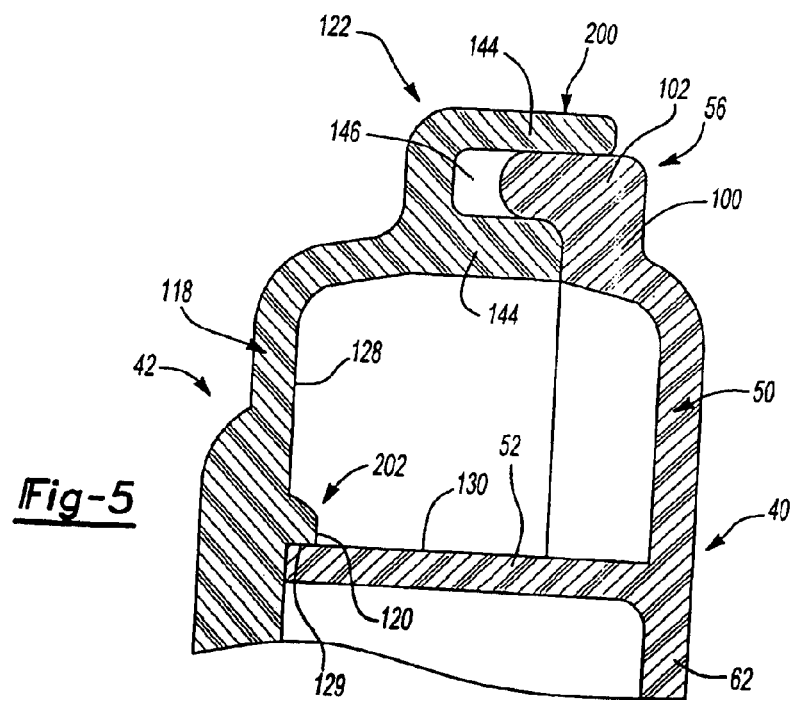
FIG. 5 is a partial sectional view taken along the line 5—5 of FIG. 1.

With reference to FIGS. 3 and 5, the first labyrinth member 56 is a generally L-shaped structure that is coupled to at least a portion of the outer perimeter of the first wall member 50. The first labyrinth member 56 includes a base portion 100, which extends from the first wall member 50, and a leg portion 102 that extends generally perpendicular to the base portion 100. The first labyrinth member 56 is spaced radially outwardly from the guard 52 and in the particular embodiment illustrated, does not extend outwardly from the generally vertical portion 62 of the first wall member 50 to the same extent as the guard 52.

With renewed reference to FIGS. 2 and 3, the first hinge structure 58 is located rearwardly of the guard 52 and includes first and second hinge bosses 110 and 112, respectively. Each of the first and second hinge bosses 110 and 112 extends generally perpendicularly from the generally vertical portion 62 of the first wall member 50. A hinge pin aperture 114 extends completely through the first hinge boss 110 and partially through the second hinge boss 112. The first hinge boss 110 also includes a slotted tab aperture 116 that intersects the hinge pin aperture 114.

Figure 6:
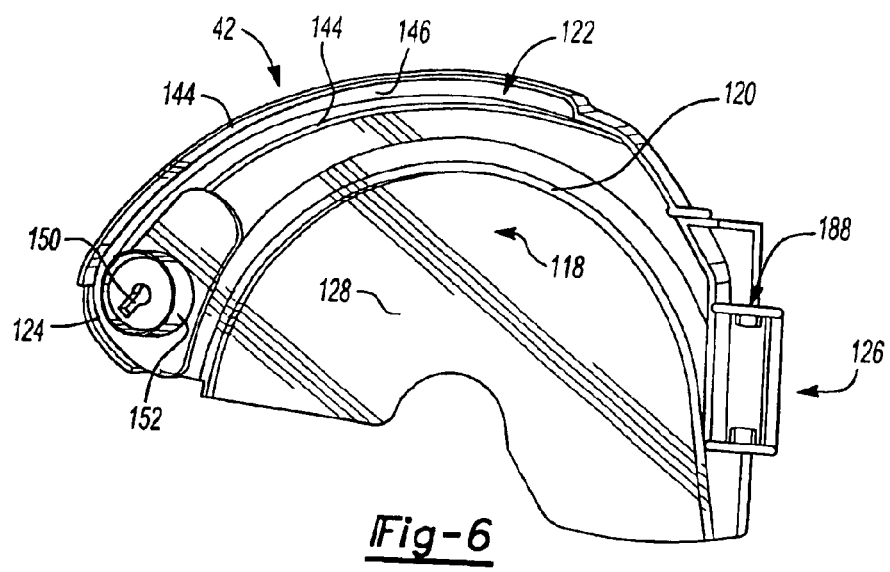
FIG. 6 is a perspective view of a portion of the power edger of FIG. 1 illustrating the door in greater detail.

With reference to FIGS. 2 and 6, the door 42 is illustrated to include a second wall member 118, a guard lip 120, a second labyrinth member 122, a latch housing structure 124 and a second hinge structure 126. The second wall member 118 is sized to cover the open end of the housing 40 and includes a generally vertically extending structure 128 that is configured to abut a side of the blade cavity 60 opposite the first wall member 50. The guard lip 120 is coupled to the generally vertically extending structure 128 and extends generally perpendicularly therefrom. The inner edge 129 of the guard lip 120 is configured to mirror the outer edge 130 of the guard 52 (FIG. 5).

With additional reference to FIG. 5, the second labyrinth member 122 is coupled to at least a portion of an outer edge of the second wall member 118. In the embodiment illustrated, the second labyrinth member 122 is generally U-shaped, having a pair of furcations 144 that extend generally perpendicular the generally vertically extending structure 128 are which are spaced apart from one another to define a void 146 therebetween.

With renewed reference to FIGS. 2 and 6, the latch housing structure 124 is illustrated to be formed into a forward portion of the door 42. An aperture 150, similar in configuration and size to the latch aperture 84 formed in the housing 40, extends through the second wall member 118. A second debris collar 152 extends circumferentially around the aperture 150 on the inner side of the second wall member 118. A collar (not specifically shown) is formed on the outer side of the second wall member 118 radially outwardly of the aperture 150.

Figure 7:
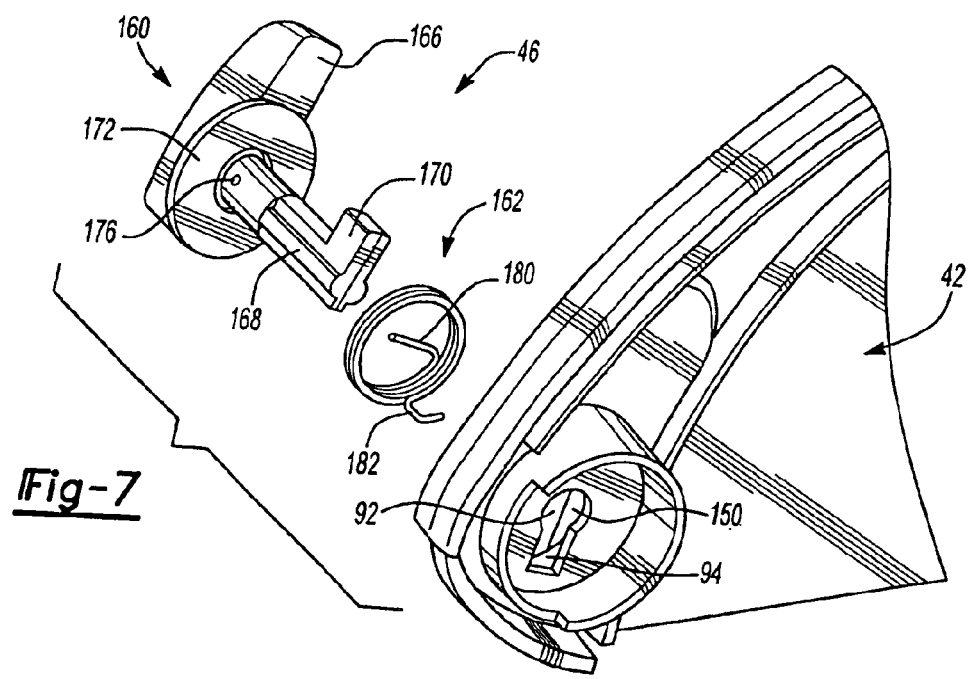
FIG. 7 is an exploded perspective view of a portion of the power edger of FIG. 1 illustrating the latch mechanism in greater detail.

With reference to FIG. 7, the latch mechanism 46 is illustrated to include a knob 160 and a spring 162. In the particular embodiment illustrated, the knob 160 includes a grip portion 166, a spindle 168 and a latch member 170. The grip portion 166 includes a flange member 172 and is configured to receive a rotary input from the thumb and forefinger of the operator of the edger 8. The flange member 172 forms a relatively large surface which supports the loads that are exerted onto the knob 160 by the spring 162 and the operator of the edger 8. The flange member 172 is sized larger than the aperture 150 so as to prevent the knob 160 from being pushed completely through the door 42. The spindle 168 is fixedly coupled to the grip portion 166 at a first end and to the latch member 170 at a second end. In the example provided, the spindle 168 is sized to rotate within the cylindrical portions 92 of the latch aperture 84 and aperture 150 that are formed into the housing 40 and the door 42, respectively. An attachment aperture 176 is formed through the spindle 168 proximate the flange member 172 on an axis that is generally perpendicular to the longitudinal axis of the spindle 168. The latch member 170 extends generally perpendicularly the longitudinal axis of the spindle 168 and is sized to be received through the slotted portion 94 of the latch aperture 84 and aperture 150.

The spring 162 is illustrated to be a combination torsion and tension spring having first and second end members 180 and 182, respectively. The first end member 180 is configured to engage a portion of the knob 160, while the second end member 182 is configured to engage the door 42. The spring 162 fits over the collar that is formed on the outer surface of the door 42; the collar serves to position the spring 162 in a radial direction relative to the aperture 150. In the example provided, the first end member 180 is a post that extends through the attachment aperture 176 that is formed through the spindle 168 while the second end member 182 is generally U-shaped, being configured to extend partially through the slotted portion 94 of the aperture 150 and engage the second wall member 118. The torsional aspect of the spring 162 biases the knob 160 in a predetermined rotational direction, which, in the particular embodiment illustrated, is counterclockwise, when looking at the outer surface of the door 42, such that the knob 160 is positioned toward a neutral position as shown in FIG. 1. The tension aspect of the spring 162 generates a biasing force that tends to push the knob 160 inwardly toward the outer surface of the door 42.

Figure 8:
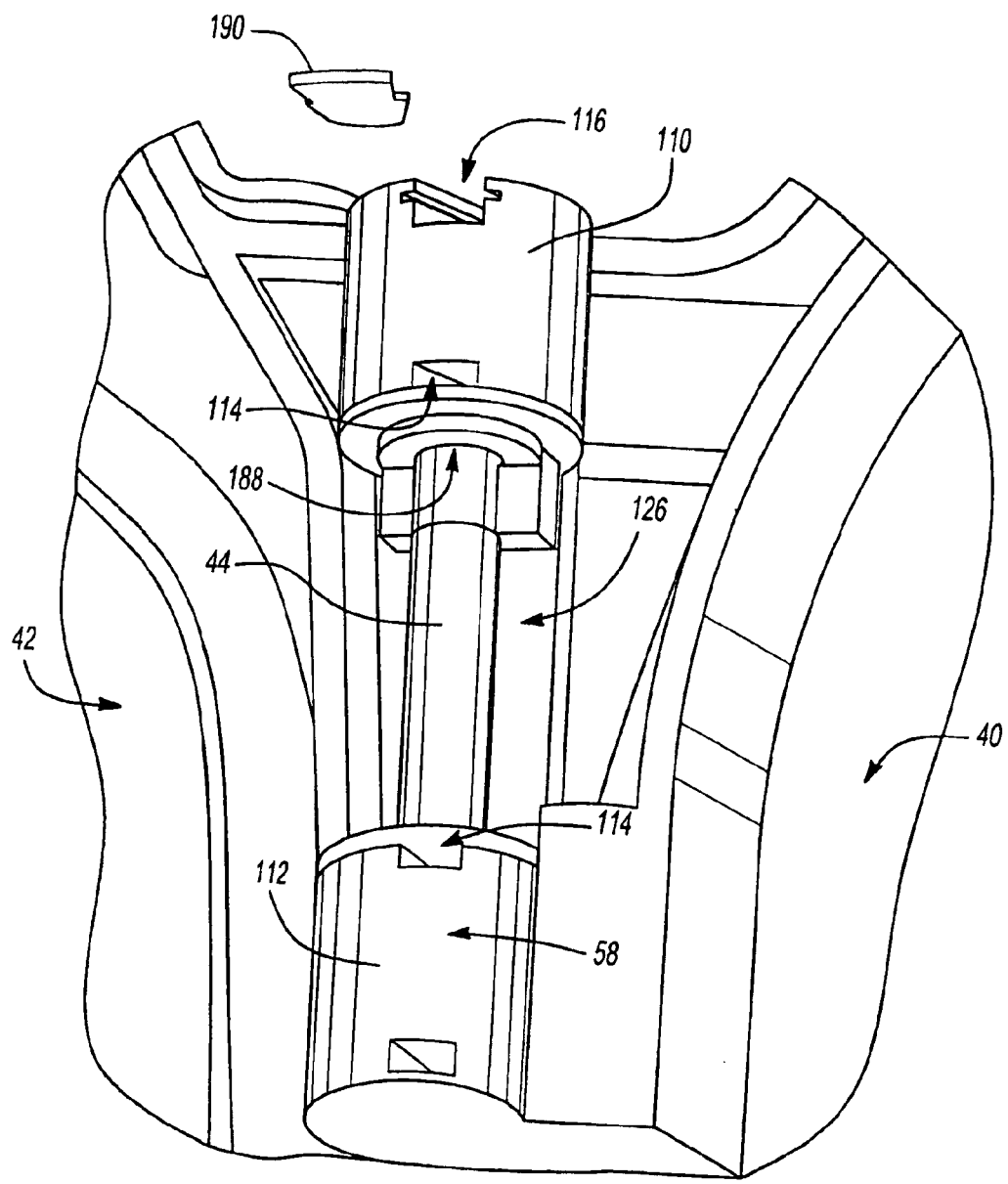
FIG. 8 is a partial exploded perspective view of the power edger of FIG. 1.

With renewed reference to FIGS. 2 and 6, the second hinge structure 126 extends outwardly from the second wall member 118, being sized in length to fit between the first and second hinge bosses 110 and 112 on the housing 40. A hinge pin aperture 188 that is sized to receive the generally cylindrically shaped hinge pin 44 extends through the second hinge structure 126. As shown in FIG. 8, the door 42 is coupled to the housing 40 such that the second hinge structure 126 is disposed between the first and second hinge bosses 110 and 112 and the hinge pin 44 is inserted into the hinge pin apertures 114 and 188. A retaining tab 190 is inserted into the slotted tab aperture 116 in the first hinge boss 110 to prevent the hinge pin 44 from becoming dislodged from the hinge pin apertures 114 and 188.

Figure 4:
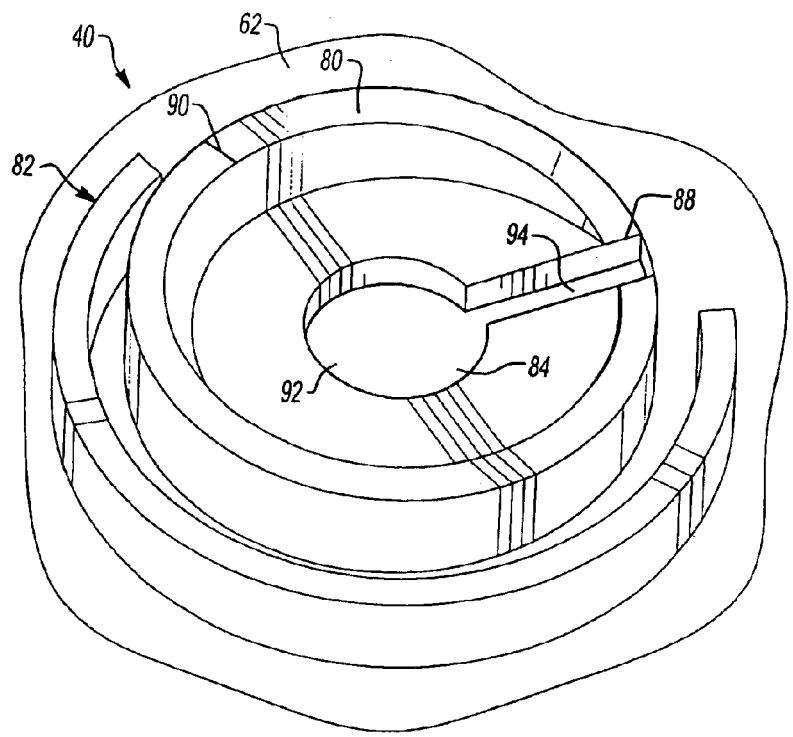
FIG. 4 is an enlarged perspective view of a portion of the housing illustrating the latch securing structure in detail.

Once coupled by the hinge pin 44, the door 42 is pivotally coupled to the housing 40 about an axis that is defined by the hinge pin 44. The door 42 is movable between a closed position, as illustrated in FIG. 1, and an open condition, as illustrated in FIG. 2. With reference to FIGS. 2, 4 and 7, as the door 42 is rotated from the open position to the closed position, the side of the latch member 170 on the knob 160 is brought into contact with the ramp portion 80 that is formed into the latch securing structure 54 of the housing 40. Further rotation of the door 42 about the hinge pin 44 toward the housing 40 causes the latch member 170 to both slide along the ramp portion 80 and rotate in a rotational direction opposite the biasing direction of the spring 162. When the door 42 has been closed sufficiently to align the latch member 170 to the slotted portion 94 of the latch aperture 84, the force applied by the spring 162 causes the latch member 170 and a portion of the spindle 168 to shoot through the latch aperture 84. The knob 160, no longer being constrained by the ramp portion 80, thereafter rotates in the predetermined biasing direction in response to the torsional biasing aspect of the spring 162 to rotate the latch member 170 relative to the slotted portion 94 of the latch aperture 84 so that the latch member 170 is no longer aligned to the slotted portion 94 of the latch aperture 84. From the foregoing, it will be apparent to those skilled in the art that the operator of the edger 8 need not manipulate any portion of the latch mechanism 46 to latch the door 42 to the housing 40. Rather, all that is needed to actuate the latch mechanism 46 to latch the door 42 to the housing 40 is to rotate the door 42 and the housing 40 together.

With reference to FIG. 5, when the door 42 is placed in a closed position, the guard lip 120 is illustrated to engage the outer perimeter of the guard 52 and the leg portion 102 of the first labyrinth member 56 is shown to engage the void 146 between the furcations 144 of the second labyrinth member 122. As thus configured, the first and second labyrinth members 56 and 122 cooperate when the door 42 is in the closed position to form a labyrinth seal 200 around at least a portion of the housing assembly 10 that inhibits dust and debris from exiting the housing assembly 10. Further, the guard lip 120 and guard 52 cooperate to form a secondary seal 202 that is located radially inwardly of the labyrinth seal 200. The secondary seal 202 additionally assists in inhibiting the transmission of dust and debris outwardly of the housing assembly 10. The secondary seal 202 also tends to inhibit the transmission of dust and debris to other portions of the housing assembly 10, such as the first and second hinge structures 58 and 126 and the latch mechanism 46.

With reference to FIGS. 4 and 7, when the door 42 is positioned in the closed position, the first and second debris collars 82 and 152 engage or nest to form a supplemental debris guard (not specifically shown) around the latch mechanism 46. The supplemental debris guard tends to inhibit the transmission of any dirt and debris that are expelled past the secondary seal 202 into the latch mechanism 46.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An edger comprising:

a blade;

a power source configured to selectively provide rotary power to the blade;

a housing assembly associated with the power source and defining a blade cavity in which the blade is mounted, the housing assembly including a housing, a cover, a latch mechanism and a latch receiving structure, the cover being pivotably mounted to the housing and movable between a closed condition and an open condition, the latch mechanism being coupled to the cover and including a latch member and a spring, the latch member being movable between a latched position and an unlatched position, the spring biasing the latch member into the latched position, the latch receiving structure being coupled to the housing and including a latch aperture and a ramp, the latch aperture receiving the latch member therethrough only when the latch member is positioned in the unlatched position, the ramp being tapered so that when the cover is rotated toward the housing, contact between the ramp and the latch member moves the latch member into the unlatched position and into alignment with the latch aperture.

2. The edger of claim 1, wherein the latch member is rotatable between the latched and unlatched positions.

3. The edger of claim 2, wherein the ramp is helically shaped.

4. The edger of claim 3, wherein the ramp is concentric with an axis about which the latch member rotates.

5. The edger of claim 2, wherein the spring is a combination torsion and tension spring.

6. The edger of claim 1, wherein the latch aperture has a generally key-hole shape.

7. The edger of claim 6, wherein the latch member is generally L-shaped.

8. The edger of claim 1, further comprising a first debris collar and a second debris collar, the first debris collar being an annular structure that extends from the housing around the ramp, the second debris collar being an annular structure that extends from the cover around the latch mechanism, the first and second debris collars nesting when the cover is in the closed condition to form a shroud around the latch mechanism.

9. An edger comprising:

a blade;

a power source configured to selectively provide rotary power to the blade;

a housing assembly associated with the power source and defining a blade cavity in which the blade is mounted, the housing assembly including a housing, a cover, a latch mechanism and a latch receiving structure, the cover being pivotably mounted to the housing and movable between a closed condition and an open condition, the latch mechanism being coupled to the cover and including a latch member and a combination torsion and tension spring, the latch member being rotatable between a latched position and an unlatched position, the combination torsion and tension spring biasing the latch member into the latched position, the latch receiving structure formed in the housing and including a key-hole shaped latch aperture and a helical ramp, the latch aperture receiving the latch member therethrough only when the latch member is positioned in the unlatched position;

wherein contact between the latch member and the ramp as the cover is being moved into the closed condition causes the latch member to move into the unlatched position and thereby into alignment with the latch aperture so that the cover may be closed against the housing.

10. The edger of claim 9, wherein the combination torsion and tension spring rotates the latch member to the latched condition after the cover has been closed against the housing.

11. The edger of claim 9, wherein the ramp terminates at a point that is located adjacent a side of the latch aperture.

12. A tool for cutting vegetation comprising:

a cutting member;

a power source configured to selectively provide rotary power to the cutting member;

a housing assembly coupled to the power source and shrouding a portion of the cutting member, the housing assembly including a housing structure, a door and a latch, the door being pivotably coupled to the housing structure, the latch having a rotatable latch member mounted on one of the housing structure and the door, the latch member requiring a manual input to rotate the latch member to thereby unlatch the latch to permit the door to be pivoted from a closed position toward an open position, the latch being configured to automatically rotate the latch member when the door is pivoted from the open position into the closed position.

13. The tool of claim 12, wherein the latch includes a spring for biasing the latch member in a predetermined biasing direction toward a predetermined neutral position.

14. The tool of claim 13, wherein the latch includes a latch receiving structure that is coupled to the other one of the housing structure and the door.

15. The tool of claim 14, wherein the latch receiving structure includes a ramp portion and a latch aperture, the ramp portion tapering downwardly toward the latch aperture, the ramp portion being configured to contact the latch member when the door is rotated toward the housing and rotate the latch member in a direction opposite the biasing direction so that the latch member is aligned with the latch aperture.

16. The tool of claim 15, wherein the ramp portion terminates at an inner most point that is located adjacent a side, of the latch aperture.

17. The tool of claim 15, wherein the ramp portion is helically shaped.

18. The tool of claim 15, wherein the latch aperture is generally key-hole shaped.

19. The tool of claim 18, wherein the latch member is generally L-shaped.

20. The tool of claim 13, wherein the spring is a combination torsion and tension spring.

21. The tool of claim 15, further comprising a first debris collar and a second debris collar, the first debris collar being an annular structure that extends from the housing around the ramp portion, the second debris collar being an annular structure that extends from the door around the latch member, the first and second debris collars nesting when the door is in the closed condition to form a shroud around the latch.

\* \* \* \* \*